(12) United States Patent
Hojo (10) Patent No.: US 7,573,689 B2
(45) Date of Patent: Aug. 11, 2009

(54) OVERCURRENT DETECTING CIRCUIT AND REGULATOR HAVING THE SAME

(75) Inventor: Yoshiyuki Hojo, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 282 days.

(21) Appl. No.: 10/597,381

(22) PCT Filed: Jan. 19, 2005

(86) PCT No.: PCT/JP2005/000605

§ 371 (c)(1),
(2), (4) Date: Jul. 22, 2006

(87) PCT Pub. No.: WO2005/071511

PCT Pub. Date: Aug. 4, 2005

(65) Prior Publication Data

US 2008/0247099 A1    Oct. 9, 2008

(30) Foreign Application Priority Data

Jan. 22, 2004    (JP)    ............... 2004-014988

(51) Int. Cl.
*H02H 3/08* (2006.01)
*H02H 9/02* (2006.01)
*H02H 9/08* (2006.01)
(52) U.S. Cl. ..................... 361/93.1; 361/93.9
(58) Field of Classification Search ............... 361/93.1, 361/93.9
See application file for complete search history.

(56) References Cited

U.S. PATENT DOCUMENTS 5,159,516 A    10/1992    Fujihira
5,646,520 A    7/1997    Frank et al.

(Continued)

FOREIGN PATENT DOCUMENTS

EP    0 881 769 A2    11/1998

(Continued)

OTHER PUBLICATIONS

International Search Report issued in the corresponding International Application No. PCT/JP2005/000605, mailed on Apr. 19, 2005.

(Continued)

*Primary Examiner*—Albert W Paladini
*Assistant Examiner*—Dharti H Patel
(74) *Attorney, Agent, or Firm*—Keating & Bennett, LLP (57) ABSTRACT

An overcurrent detection circuit that minimizes fluctuations in the overcurrent detection level when the input supply voltage or temperature fluctuates includes a monitor transistor having a control terminal and an output terminal which are connected to a control terminal and an output terminal respectively of an output transistor, an output current detection transistor having a control terminal to which a detection bias voltage is input, and an output terminal which is connected to an input terminal of the monitor transistor, a constant current source that generates a reference current, a reference transistor having a control terminal to which the detection bias voltage is input and an output terminal to which the reference current flows to the constant current source, and a comparison circuit that outputs an overcurrent detection signal by comparing the voltage of the output terminal of the output current detection transistor and the voltage of the output terminal of the reference transistor.

6 Claims, 5 Drawing Sheets

U.S. PATENT DOCUMENTS

| | | | |
|---|---|---|---|
| 5,670,867 A | | 9/1997 | Mitsuda |
| 5,973,551 A | * | 10/1999 | Mitsuda ................. 327/543 |
| 6,801,419 B2 | * | 10/2004 | Fukui .................... 361/93.1 |
| 7,411,376 B2 | * | 8/2008 | Zhang .................... 323/277 |
| 2003/0122530 A1 | | 7/2003 | Hikita |
| 2007/0139839 A1 | * | 6/2007 | Yoshihara ............. 361/93.1 |

FOREIGN PATENT DOCUMENTS

| | | |
|---|---|---|
| JP | 05-076133 A | 3/1993 |
| JP | 08-331757 A | 12/1996 |
| JP | 09-167928 A | 6/1997 |
| JP | 10-322185 A | 12/1998 |

OTHER PUBLICATIONS

Official communication issued in counterpart European Application No. 05703842.4, mailed on Dec. 19, 2007.

* cited by examiner

PRIOR ART

Fig.5
PRIOR ART

OVERCURRENT DETECTING CIRCUIT AND REGULATOR HAVING THE SAME

BACKGROUND OF THE INVENTION

1. Field of the Invention

The present invention relates to an overcurrent detection circuit which, when an overcurrent flows to an output transistor that outputs current to a load in a regulator that converts a supply voltage into a predetermined DC voltage, for example, detects the overcurrent and provides protection, and also relates to a regulator including such an overcurrent detection circuit.

2. Description of the Related Art

A regulator such as a switching regulator or series regulator has an output transistor provided between a supply voltage that is input and a terminal that is connected to the load and outputs a predetermined DC voltage. The regulator maintains a predetermined DC voltage by controlling the output transistor. Further, in order to prevent the output transistor from being damaged by an overcurrent in the event of an anomaly such as when there is a short-circuit of the load, a circuit to detect the overcurrent and implement protection is provided (See, for example, Japanese Patent Application Laid-open No. H8-331757).

Figure 4:
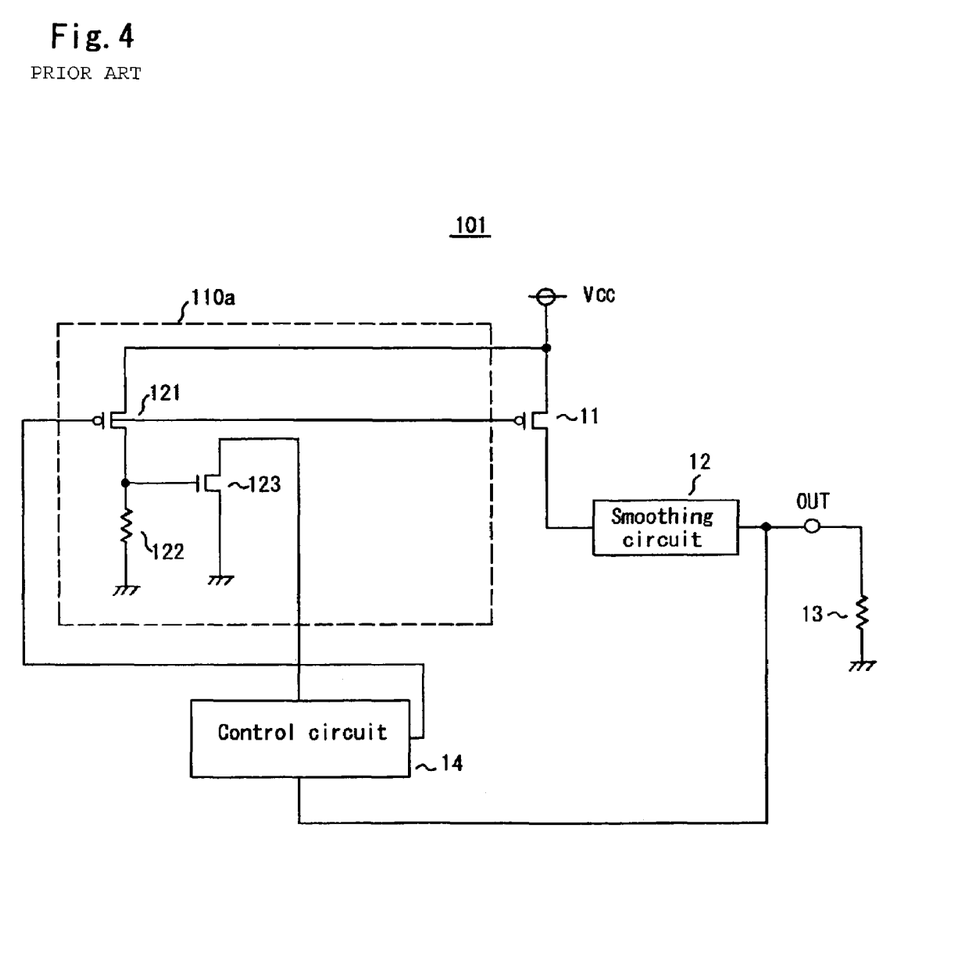
FIG. 4 is a circuit diagram of a conventional overcurrent detection circuit and a regulator that includes an overcurrent detection circuit.

FIG. 4 shows a conventional overcurrent detection circuit and a regulator that includes the conventional overcurrent detection circuit. The regulator 101 is constituted by an output transistor 11 of a P-type MOS transistor, a smoothing circuit 12 that smoothes the output of the output transistor 11, an output terminal OUT that outputs a smoothed predetermined DC voltage, a control circuit 14 that controls the output transistor 11 by inputting the voltage of the output terminal OUT as feedback, and an overcurrent detection circuit 110a that detects the overcurrent of the output transistor 11 and implements protection. A load 13 is connected to the output terminal OUT.

The overcurrent detection circuit 110a is constituted by a monitor transistor 121 of a P-type MOS transistor, the source of which is connected to a supply voltage $V_{cc}$ and the gate of which is connected to the gate of the output transistor 11, an output current detection resistor 122, one end of which is connected to the drain of the monitor transistor 121 and the other end of which is grounded, an overcurrent detection output transistor 123 of an N-type MOS transistor, the gate of which is connected to an interconnect between the drain of the monitor transistor 121 and the output current detection resistor 122, the drain of which is connected to the control circuit 14, and the source of which is grounded. Here, the size of the monitor transistor 121 is set at 1/N that of the output transistor 11. The current flowing to the monitor transistor 121 is only used in the overcurrent detection. Therefore, N is a natural number with a large value to minimize the current value so that the power loss is not increased.

Now, when an output current $I_o$ flows to the output transistor 11, a current having a value of substantially $I_o/N$ flows to the monitor transistor 121 and a corresponding voltage is produced in the output current detection resistor 122 with ground potential serving as a reference. Further, when the output current $I_o$ become an overcurrent and the voltage exceeds a threshold value (Vth) of the overcurrent detection output transistor 123, the overcurrent detection output transistor 123 outputs a low level. As a result, the control circuit 14 turns OFF the output transistor 11 since the output current of the output transistor 11 exceeds the overcurrent detection level (since it is determined that an overcurrent is flowing). Here, the overcurrent detection level can be adjusted by the size of the monitor transistor 121 and the resistance value of the output current detection resistor 122.

Figure 5:
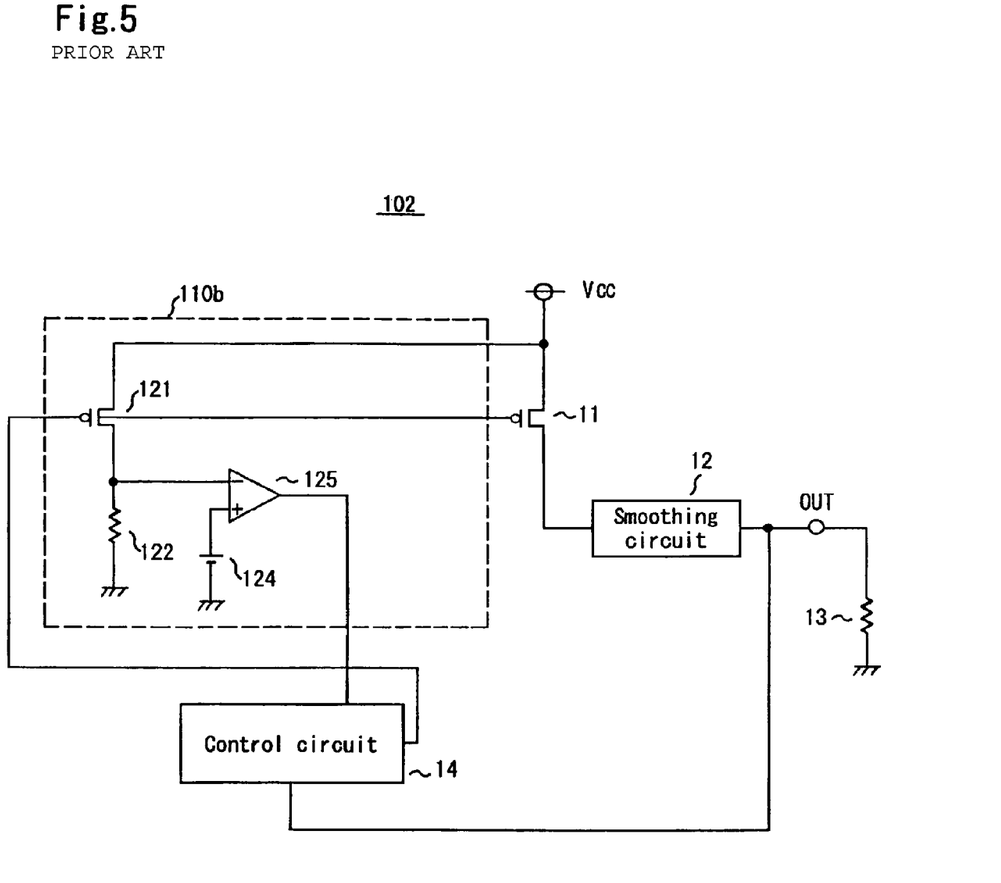
FIG. 5 is a circuit diagram of another conventional overcurrent detection circuit and a regulator that includes the overcurrent detection circuit.

Thereafter, another conventional overcurrent detection circuit and a regulator including the overcurrent detection circuit are shown in FIG. 5. The regulator 102 has substantially the same constitution as the regulator 101 apart from the overcurrent detection circuit 110b. The overcurrent detection circuit 110b also includes the monitor transistor 121 and output current detection resistor 122 as per the overcurrent detection circuit 110a above. The overcurrent detection circuit 110b includes an overcurrent detection output comparator 125 instead of the overcurrent detection output transistor 123. The overcurrent detection output comparator 125 has an inversion input terminal connected to the interconnect between the monitor transistor 121 and output current detection resistor 122, a non-inversion input terminal connected to an overcurrent detection reference voltage 124, and an output terminal connected to the control circuit 14.

When the output current $I_o$ flows to the output transistor 11, a current of substantially $I_o/N$ flows to the monitor transistor 121 and the corresponding voltage is produced in the output current detection resistor 122 with the ground potential serving as the reference. When the output current $I_o$ becomes an overcurrent and the voltage exceeds the overcurrent detection reference voltage 124, the overcurrent detection output comparator 125 outputs a low level. As a result, the control circuit 14 turns OFF the output transistor 11 since the output current of the output transistor 11 exceeds the overcurrent detection level. Here, the overcurrent detection level can be adjusted by the size of the monitor transistor 121, the resistance value of the output current detection resistor 122, and the value of the overcurrent detection reference voltage 124.

Thus, the overcurrent detection circuits 110a and 110b are able to detect the overcurrent flowing to the output transistor 11. The present inventor, who conducted research into further improving the accuracy of the overcurrent detection level of the overcurrent detection circuit, focused attention on the voltage produced in the output current detection resistor 122 in the overcurrent detection circuits 110a and 110b, that is, the drain voltage of the monitor transistor 121 is produced with ground potential as a reference, whereas the drain voltage of the output transistor 11 is produced not with ground potential as a reference. That is, the voltage of the drain of the monitor transistor 121 accordingly differs from the voltage of the drain of the output transistor 11 and, as a result, it is assumed that the current of the monitor transistor 121 is different from the value $I_o/N$.

Therefore, although consideration was paid to adjusting the overcurrent detection level by calculating the difference beforehand and changing the resistance value of the output current detection resistor 122, because the magnitude of the displacement also varies when the input supply voltage $V_{cc}$ fluctuates, such a countermeasure is ineffective.

Furthermore, the present inventor also focused on the effect on the overcurrent detection level resulting from the fact that the monitor transistor 121 and output transistor 11 have different temperature characteristics from the output current detection resistor 122 when the temperature fluctuates. Further, because the characteristic of the overcurrent detection output transistor 123 in the overcurrent detection circuit 110a also fluctuates, it is assumed that the overcurrent detection level further fluctuates.

SUMMARY OF THE INVENTION

In order to overcome the problems described above, preferred embodiments of the present invention provide an overcurrent detection circuit and a regulator that includes an overcurrent detection circuit that minimizes fluctuations in the overcurrent detection level when the input supply voltage or temperature fluctuates.

An overcurrent detection circuit according to a preferred embodiment of the present invention is an overcurrent detection circuit which detects an overcurrent when the overcurrent flows to an output transistor having an input terminal to which a supply voltage is input, a control terminal to which a control voltage is input, and an output terminal from which an output current is output, including a monitor transistor having a control terminal and an output terminal which are connected to the control terminal and the output terminal respectively of the output transistor, an output current detection transistor having an input terminal to which a supply voltage is input and a control terminal to which a detection bias voltage is input, and an output terminal of which is connected to an input terminal of the monitor transistor, a constant current source that generates a reference current, a reference transistor having an input terminal to which a supply voltage is input, a control terminal to which the detection bias voltage is input and an output terminal from which a reference current flows to the constant current source, and a comparison circuit that detects an overcurrent when the overcurrent flows to the output transistor by comparing the voltage of the output terminal of the output current detection transistor and the voltage of the output terminal of the reference transistor, and outputs an overcurrent detection signal.

The output transistor, the monitor transistor, the output current detection transistor, and the reference transistor are preferably P-type MOS transistors.

The comparison circuit preferably includes a diode-connected first comparison transistor that is interposed between the constant current source and the reference transistor, a second constant current source that generates a current that is a predetermined multiple of the reference current generated by the constant current source, and a second comparison transistor that is interposed between the second constant current source and the output current detection transistor, a control terminal of the second comparison transistor being connected to a control terminal of the first comparison transistor.

The regulator according to a preferred embodiment of the present invention is a regulator including the above-described overcurrent detection circuit, wherein the output transistor is provided between a supply voltage and an output terminal that outputs a predetermined DC voltage, and the regulator further includes a control circuit that controls the output transistor to maintain the predetermined DC voltage by inputting the voltage of the output terminal as feedback and that turns off the output transistor when the overcurrent detection signal of the overcurrent detection circuit is input to the control circuit.

The overcurrent detection circuit according to a preferred embodiment of the present invention preferably includes a serial body of a monitor transistor and an output current detection transistor provided in parallel with an output transistor, and a reference transistor provided in parallel with an output current detection transistor. Because the overcurrent detection circuit detects an overcurrent by comparing the output of the output current detection transistor with the output of the reference transistor, even when the input supply voltage or temperature fluctuates, the characteristics of these transistors do not fluctuate very much in relative terms and the fluctuations in the overcurrent detection level can be minimized. Further, the regulator that includes the overcurrent detection circuit has a stable overcurrent detection level and, therefore, reliability can be improved.

These and other elements, features, characteristics and advantages of preferred embodiments of the present invention will be apparent from the following detailed description of preferred embodiments of the present invention with reference to the attached drawings.

DETAILED DESCRIPTION OF PREFERRED EMBODIMENTS

Figure 1:
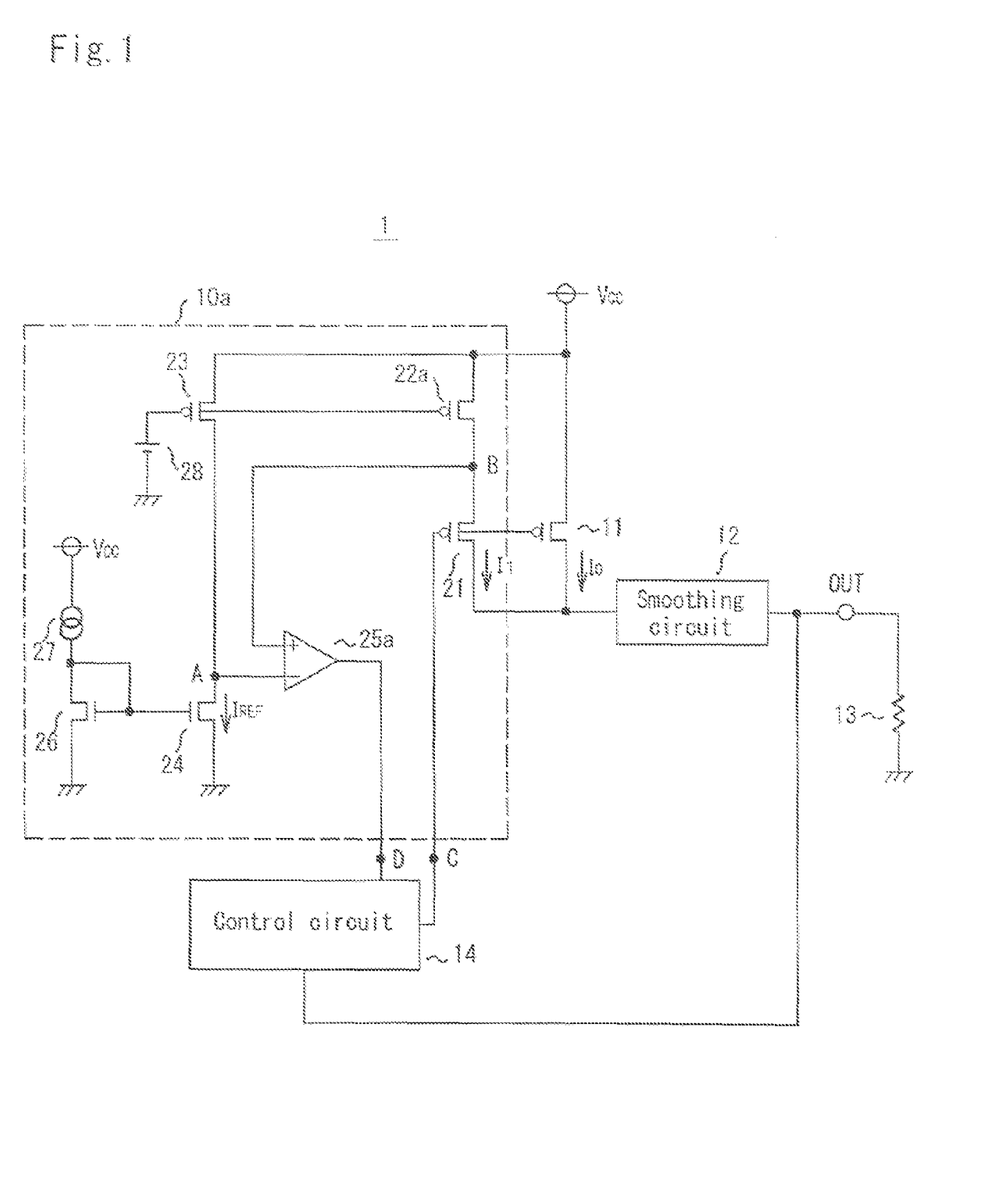
FIG. 1 is a circuit diagram of an overcurrent detection circuit according to a preferred embodiment of the present invention and a regulator that includes the overcurrent detection circuit.

Preferred embodiments of the present invention will be described hereinbelow with reference to the drawings. FIG. 1 is a circuit diagram of an overcurrent detection circuit according to a preferred embodiment of the present invention and a regulator that includes an overcurrent detection circuit. This regulator 1 preferably includes an output transistor 11 of a P-type MOS transistor between a supply voltage $V_{cc}$ and an output terminal OUT and maintains the output terminal OUT at a predetermined DC voltage by controlling the output transistor 11 and, when an overcurrent flows to the output transistor 11, an overcurrent detection circuit 10a detects the overcurrent and turns OFF the output transistor 11. To describe this in more detail, the regulator 1 preferably includes an output transistor 11 having an input terminal (source) to which a supply voltage $V_{cc}$ is input, a control terminal (gate) to which a control voltage is input, and an output terminal (drain) from which the output current $I_o$ is output, a smoothing circuit 12 that smoothes the voltage produced at the output terminal of the output transistor 11, an output terminal OUT that outputs a predetermined DC voltage that has been smoothed, a control circuit 14 that controls the output transistor 11 via node C in FIG. 1 in order to maintain the predetermined DC voltage by inputting the voltage of the output terminal OUT as feedback and that, when the overcurrent detection signal of the overcurrent detection circuit 10a is input to the control circuit 14 from node D, establishes the control voltage of node C at the supply voltage $V_{cc}$ level in order to turn OFF the output transistor 11, and the overcurrent detection circuit 10a that detects an overcurrent when an overcurrent flows to the output transistor 11 and outputs the overcurrent detection signal to the control circuit 14 from node D. Load 13 is connected to the output terminal OUT.

The overcurrent detection circuit 10a preferably includes a monitor transistor 21 of a P-type MOS transistor having a control terminal (gate) and an output terminal (drain) which are connected to the control terminal (gate) and an output terminal (drain) respectively of the output transistor 11, an output current detection transistor 22a of a P-type MOS transistor having an input terminal (source) to which the supply voltage $V_{cc}$ is input, a control terminal (gate) to which a detection bias voltage 28 is input, and an output terminal (drain) of the output current detection transistor 22a being connected to the input terminal (source) of the monitor transistor 21, a constant current source 24 of an N-type MOS transistor that generates a reference current $I_{REF}$ (10 μA, for example), a reference transistor 23 of a P-type MOS transistor having an input terminal (source) to which the supply voltage $V_{cc}$ is input, a control terminal (gate) to which a detection bias voltage 28 is input, and an output terminal (drain) from which the reference current $I_{REF}$ flows to the constant current source 24, and a comparison circuit 25a including a comparator that compares the voltage (that is, the voltage of node B in FIG. 1) of the output terminal (drain) of the output current detection transistor 22a and the voltage (that is, the voltage of node A in FIG. 1) of the output terminal (drain) of the reference transistor 23 and outputs a detection signal to node D. The comparison circuit 25a more specifically outputs a high-level detection signal when an overcurrent is not flowing to the output transistor 11 and outputs a low-level overcurrent detection signal when an overcurrent is flowing and is detected. That is, the overcurrent detection circuit 10a has a serial body including the monitor transistor 21 and an output current detection transistor 22a provided in parallel with the output transistor 11 and has the reference transistor 23 provided in parallel with the output current detection transistor 22a, and detects an overcurrent by comparing the output of the output current detection transistor 22a with the output of the reference transistor 23. The monitor transistor 21, output current detection transistor 22a, and reference transistor 23 are equal in size and set at 1/N (1/50000, for example) the size of the output transistor 11. The overcurrent detection circuit 10a further includes an N-type MOS transistor 26 and constant current source 27 which determine the current value of the constant current source 24.

The detection bias voltage 28 that is commonly input to the control terminals of the output current detection transistor 22a and reference transistor 23 is preferably made to substantially match the voltage of the control terminal (gate) of the monitor transistor 21. For example, when the regulator 1 is a switching regulator, the detection bias voltage 28 is preferably at the ground voltage level.

Figure 2:
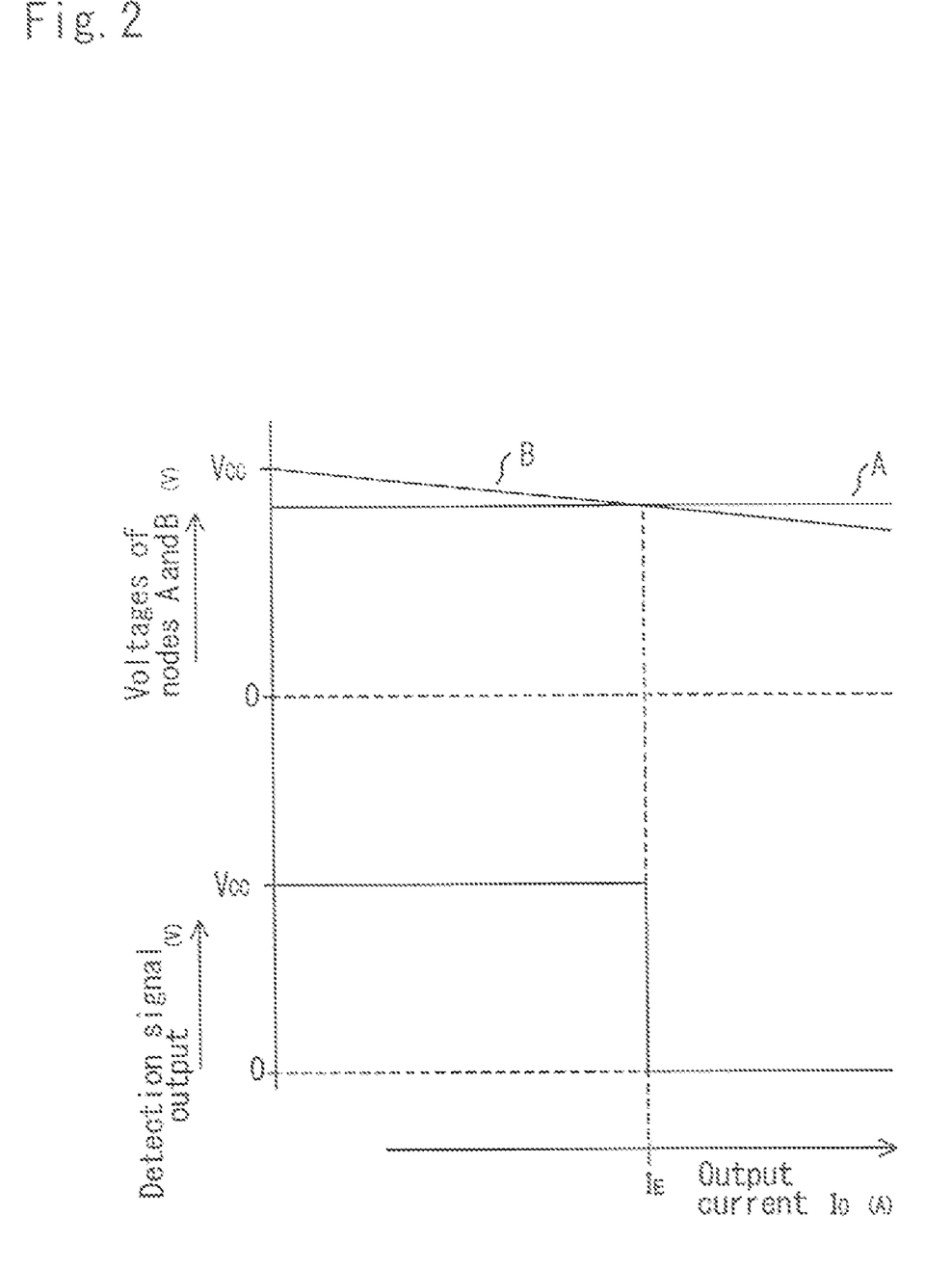
FIG. 2 is an operating waveform diagram of the overcurrent detection circuit of FIG. 1.

The operation of the overcurrent detection circuit 10a will be described next on the basis of the operating waveform diagram in FIG. 2. The operating waveform diagram shows the operating waveforms of nodes A and B (curves A and B), that is, the change in the voltages of nodes A and B with respect to the output current $I_o$, and the operating waveforms of the comparison circuit 25a, that is, the change in the detection signal output (voltage of node D). The sizes of the monitor transistor 21 and output current detection transistor 22a are set at 1/N that of the output transistor 11. Hence, when the output current $I_o$ flows to the output transistor 11, the current $I_1$ flowing to the serially connected (serial body) monitor transistor 21 and output current detection transistor 22a is then substantially $I_o/2N$. That is, supposing that the value of the equivalent resistors of the monitor transistor 21 and output current detection transistor 22a is R, the value of the equivalent resistor of the output transistor 11 is R/N, whereby the following equations are established.

$$RI_1+RI_1=RI_o/N \quad (1)$$

Hence, $$I_1=I_o/2N \quad (2).$$

Further, the voltage required to cause a current of $I_o/2N$ to flow to the output current detection transistor 22a is produced at node B with the supply voltage $V_{cc}$ serving as a reference. The voltage of node B drops linearly when the output current $I_o$ of the output transistor 11 increases. On the other hand, the voltage required to cause the reference current $I_{REF}$ to flow to the reference transistor 23 is produced at node A with the supply voltage $V_{cc}$ serving as a reference. Therefore, when the output current $I_o$ of the output transistor 11 increases and the current $I_o/2N$ flowing to the monitor transistor 21 and output current detection transistor 22a exceeds the value of the reference current $I_{REF}$, that is, supposing that the voltage of node B drops to or below the voltage of node A, the detection signal of node D constituting the output of the comparison circuit 25a changes from a high level to a low level (overcurrent detection signal). More specifically, when N is set at 50000 and the reference current $I_{REF}$ is set at 10 μA, the current $I_o$ of the output transistor 11 is equal to or more than substantially 1 A (amperes) and the detection signal of node D assumes a low level. As a result, the control circuit 14 turns OFF the output transistor 11 since the output current $I_o$ of the output transistor 11 exceeds the overcurrent detection level $I_E$ (since it is judged that an overcurrent is flowing).

Here, the voltages of the respective output terminals (drains) of the monitor transistor 21 and output current detection transistor 22a of the serial body and of the reference transistor 23 are produced in accordance with the value of the current flowing thereto as per the output transistor 11, with the supply voltage $V_{cc}$ serving as a reference. Therefore, a displacement of the ratio of the currents flowing to these transistors from the ratio of size thereof, which is caused by fluctuations in the voltages of the output terminals (drains) of these transistors due to the effect of other elements, is minimized. Even when the supply voltage $V_{cc}$ fluctuates, the voltages of the output terminals (drains) of these transistors are produced with the supply voltage $V_{cc}$ serving as a reference. Hence, the effect is not received and fluctuations in the overcurrent detection level $I_E$ are barely induced.

In addition, the output transistor 11, monitor transistor 21, output current detection transistor 22a, and reference transistor 23 are all preferably P-type MOS transistors and have the same temperature characteristic. Hence, the characteristics of the monitor transistor 21, output current detection transistor 22a, and reference transistor 23 vary in the same way as the characteristic of the output transistor 11 even when the temperature fluctuates and fluctuations in the overcurrent detection level $I_E$ produced as a result of fluctuations in temperature can be minimized.

Figure 3:
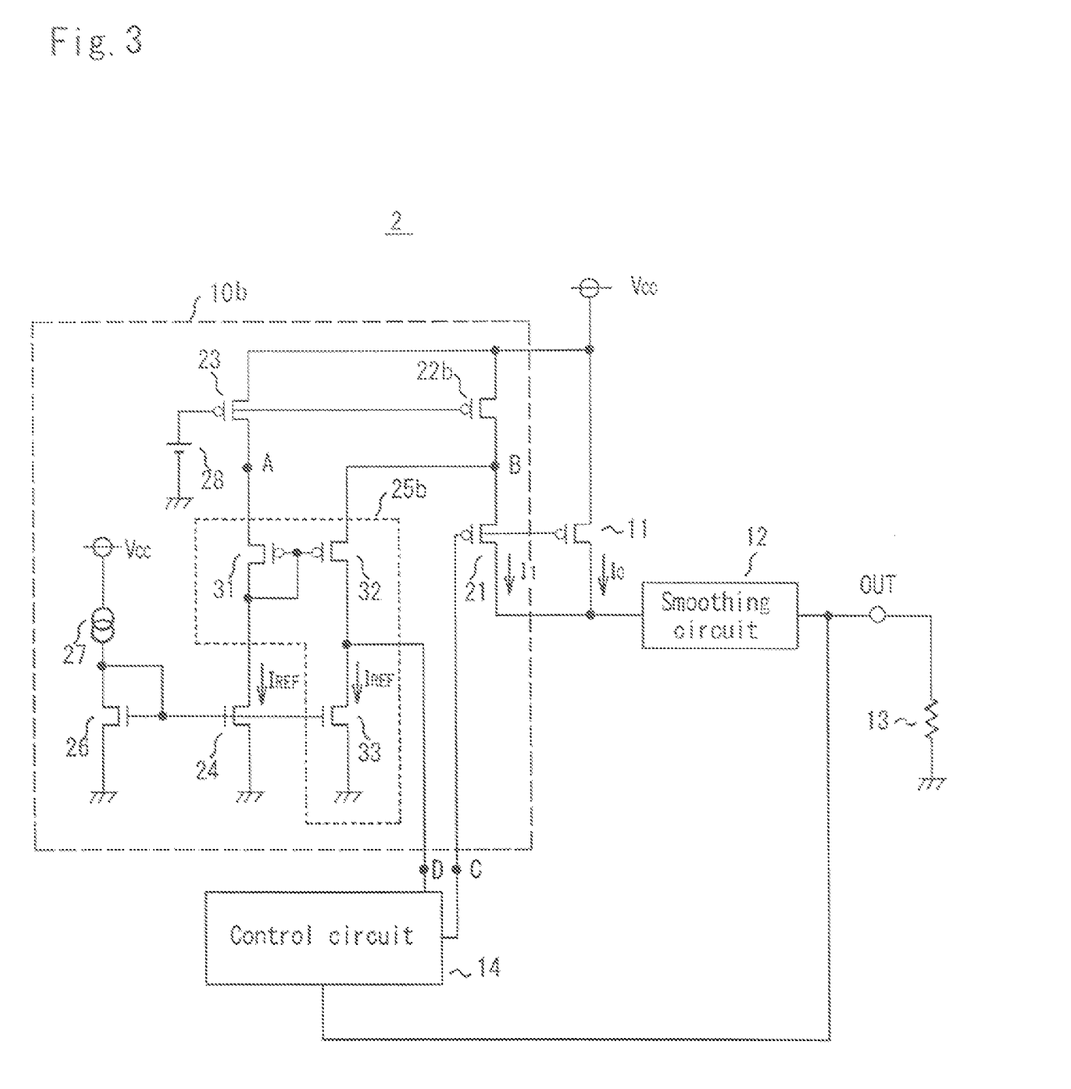
FIG. 3 is a circuit diagram of an overcurrent detection circuit according to another preferred embodiment of the present invention and a regulator that includes the overcurrent detection circuit.

An overcurrent detection circuit according to another preferred embodiment of the present invention and a regulator that includes the overcurrent detection circuit will be described next on the basis of FIG. 3. The regulator 2 has substantially the same constitution as that of the regulator 1 above apart from the overcurrent detection circuit 10b and, therefore, the overcurrent detection circuit 10b will be described below.

As per the overcurrent detection circuit 10a, the overcurrent detection circuit 10b includes the monitor transistor 21, an output current detection transistor 22b, the reference transistor 23, and the constant current source 24 that generates the reference current $I_{REF}$. However, although the sizes of the monitor transistor 21 and reference transistor 23 are established as the same as those of the overcurrent detection circuit 10a, the size of the output current detection transistor 22b is established as two times the size of the monitor transistor 21 and reference transistor 23.

The overcurrent detection circuit 10b preferably includes a comparison circuit 25b including another circuit constitution instead of the comparison circuit 25a including the comparator of the above-described preferred embodiment. The comparison circuit 25b includes a first comparison transistor 31 of a diode-connected (the output terminal (drain) and control terminal (gate) thereof are connected) P-type MOS transistor that is interposed between the constant current source 24 and reference transistor 23, a second constant current source 33 that generates a current that is a predetermined multiple (equal value in this embodiment) of the reference current $I_{REF}$ generated by the constant current source (N-type MOS transistor) 24 by having a common gate voltage with the constant current source 24, and a second comparison transistor 32 of a P-type MOS transistor that is interposed between the second constant current source 33 and the output current detection transistor 22b, the control terminal (gate) of the second comparison transistor 32 being connected to the control terminal (gate) of the first comparison transistor 31. Therefore, when the potential of the input terminal (source) of the second comparison transistor 32 drops below that of the input terminal (source) of the first comparison transistor 31, current no longer flows to the second comparison transistor 32 (the second comparison transistor 32 is turned OFF).

The operation of the overcurrent detection circuit 10b will be described next. Supposing that the value of the equivalent resistance of the monitor transistor 21 and reference transistor 23 is R, the value of the equivalent resistance of the output current detection transistor 22b is then R/2 and the value of the equivalent resistance of the output transistor 11 is R/N. The current flowing to the output current detection transistor 22b is divided into a current $I_1$ that flows to the monitor transistor 21 and a current $I_{REF}$ that flows to the second constant current source 33. Hence, a voltage $R(I_{REF}+I_1)/2$ that is required in order for the current $I_{REF}+I_1$ to flow to the output current detection transistor 22b is produced at node B with the supply voltage $V_{cc}$ serving as a reference. And, $$R(I_{REF}+I_1)/2+RI_1=RI_O/N \quad (3)$$

is established and the current $I_1$ flows to the monitor transistor 21 to satisfy this equation.

On the other hand, a voltage $RI_{REF}$ required in order for the reference current $I_{REF}$ to flow to the reference transistor 23 is produced at node A with the supply voltage $V_{cc}$ serving as a reference. When the voltage of node B is equal to the voltage of node A, $$R(I_{REF}+I_1)/2=RI_{REF} \quad (4)$$

is established. Solving this equation gives:

$$I_1=I_{REF} \quad (5).$$

Further, when Equation (5) is substituted into Equation (3)

$$I_1=I_{REF}=I_O/2N \quad (6).$$

Further, when current $I_1$ that flows to the monitor transistor 21 exceeds current $I_{REF}$, the voltage of node B drops below that of node A and, therefore, the second comparison transistor 32 is turned OFF and the output of the comparison circuit 25b, that is, the detection signal of node D changes from a high level to a low level (overcurrent detection signal). More specifically, supposing that N is set at 50000 and the reference current $I_{REF}$ is set at 10 μA, when the output current $I_o$ of the output transistor 11 is equal to or more than 1 A, the detection signal of node D assumes a low level.

Thus, as per the overcurrent detection circuit 10a, when an overcurrent flows to the output transistor 11, the overcurrent detection circuit 10b is able to detect the overcurrent and output an overcurrent detection signal from node D to the control circuit 14. In addition, the comparison circuit 25b of the overcurrent detection circuit 10b does not use a comparator such as the comparison circuit 25a of the overcurrent detection circuit 10a. Hence, the number of elements constituting the circuit can be reduced and the occupied surface area and power consumption can be reduced.

In the overcurrent detection circuit 10a or 10b, the reference current $I_{REF}$ may be changed in order to adjust the overcurrent detection level $I_E$. Further, in the case of overcurrent detection circuit 10b, by changing the predetermined scaling factor of the current value that flows by changing the size of the second constant current source (N-type MOS transistor) 33 with respect to the constant current source (N-type MOS transistor) 24, the overcurrent detection level $I_E$ can also be adjusted. For example, when the size of the second constant current source (N-type MOS transistor) 33 is ½, when $$I_{REF}=2I_o/5N \quad (7),$$

the voltage of node B equals the voltage of node A. Hence, supposing that N is set at 50000 and the reference current $I_{REF}$ is set at 10 μA, the overcurrent detection level $I_E$ is 1.25 A.

In addition, the overcurrent detection level $I_E$ can also be adjusted by changing the ratio of the size of the reference transistor 23 with respect to that of the monitor transistor 21 and output current detection transistor 22a (22b). For example, in the case of the overcurrent detection circuit 10a, supposing that the size of the reference transistor 23 is ½ that of the monitor transistor 21 and output current detection transistor 22a, the overcurrent detection level $I_E$ is 2 A under the above conditions (that N is 50000 and the reference current $I_{REF}$ is 10 μA). Furthermore, in the case of the overcurrent detection circuit 10b, supposing that the size of the reference transistor 23 is ½ that of the monitor transistor 21, when $$I_{REF}=I_o/5N \quad (8),$$

the voltage of node B equals the voltage of node A. Hence, the overcurrent detection level $I_E$ is then 2.5 A under the above conditions (that N is 50000 and the reference current $I_{REF}$ is 10 μA).

The present invention is not limited to the above-described preferred embodiments. A variety of design modifications within the scope of the items appearing in the claims are possible. For example, although, in the above-described preferred embodiments, the description was such that the output transistor 11 of the regulator is preferably a P-type MOS transistor, and the monitor transistor 21, output current detection transistor 22a (22b) and reference transistor 23 of the overcurrent detection circuit may preferably be all P-type MOS transistors, the output transistor 11 can also be an N-type MOS transistor, a PNP-type bipolar transistor or an NPN-type bipolar transistor. In this case, it is understood that the overcurrent detection circuit may be constituted by the monitor transistor 21, output current detection transistor 22a (22b), and reference transistor 23 adapted to the type of the output transistor 11.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An overcurrent detection circuit which detects an overcurrent when the overcurrent flows to an output transistor including an input terminal to which a supply voltage is input, a control terminal to which a control voltage is input, and an output terminal from which an output current is output, the overcurrent detection circuit comprising:
   a monitor transistor including a control terminal and an output terminal which are connected to the control terminal and the output terminal respectively of the output transistor;
   an output current detection transistor including an input terminal to which a supply voltage is input, a control terminal to which a detection bias voltage is input, and an output terminal which is connected to an input terminal of the monitor transistor;
   a constant current source that generates a reference current;
   a reference transistor including an input terminal to which a supply voltage is input, a control terminal to which the detection bias voltage is input, and an output terminal from which the reference current flows to the constant current source; and
   a comparison circuit that detects an overcurrent when the overcurrent flows to the output transistor by comparing the voltage of the output terminal of the output current detection transistor and the voltage of the output terminal of the reference transistor, and outputs an overcurrent detection signal.

2. The overcurrent detection circuit according to claim 1, wherein the output transistor, the monitor transistor, the output current detection transistor, and the reference transistor are P-type MOS transistors.

3. The overcurrent detection circuit according to claim 1, wherein the comparison circuit comprises:
   a diode-connected first comparison transistor that is interposed between the constant current source and the reference transistor;
   a second constant current source that generates a current that is a predetermined multiple of the reference current generated by the constant current source; and
   a second comparison transistor that is interposed between the second constant current source and the output current detection transistor, a control terminal of the second comparison transistor being connected to a control terminal of the first comparison transistor.

4. A regulator comprising the overcurrent detection circuit according to claim 1, wherein the output transistor is provided between a supply voltage and an output terminal that outputs a predetermined DC voltage, and the regulator further includes a control circuit that controls the output transistor to maintain the predetermined DC voltage by inputting the voltage of the output terminal as feedback and that turns off the output transistor when the overcurrent detection signal of the overcurrent detection circuit is input to the control circuit.

5. A regulator comprising the overcurrent detection circuit according to claim 2, wherein the output transistor is provided between a supply voltage and an output terminal that outputs a predetermined DC voltage, and the regulator further includes a control circuit that controls the output transistor to maintain the predetermined DC voltage by inputting the voltage of the output terminal as feedback and that turns off the output transistor when the overcurrent detection signal of the overcurrent detection circuit is input to the control circuit.

6. A regulator comprising the overcurrent detection circuit according to claim 3, wherein the output transistor is provided between a supply voltage and an output terminal that outputs a predetermined DC voltage, and the regulator further includes a control circuit that controls the output transistor to maintain the predetermined DC voltage by inputting the voltage of the output terminal as feedback and that turns off the output transistor when the overcurrent detection signal of the overcurrent detection circuit is input to the control circuit.

* * * * *